United States Patent Office 3,294,872
Patented Dec. 27, 1966

3,294,872
PRODUCTS OF THE REACTION OF PHOSPHONI-
TRILIC CHLORIDE TRIMER WITH CATECHOL
Harry Rex Allcock, Darien, Conn., assignor to American
Cyanamid Company, Stamford, Conn., a corporation of
Maine
No Drawing. Filed July 10, 1964, Ser. No. 381,901
2 Claims. (Cl. 260—927)

The present invention is a continuation-in-part of U.S. application Serial No. 264,763, filed March 13, 1963, and now abandoned.

The present invention relates to novel compounds and methods of preparing same. More particularly, the instant discovery concerns the reaction of a phosphonitrilic halide trimer with a substituted or unsubstituted catechol and a base to produce the corresponding substituted or unsubstituted trispiro [1,3,5,2,4,6 - triazatriphosphorine-2,2'; 4,2''; 6,2'''-tris(1,3,2)benzodioxaphosphole] or trispiro-[1,3,5,2,4,6 - triazatriphosphorine - 2,2'; 4,2''; 6,2''' - tris-(1,3,2)benzodithiophosphole] or trispiro[1,3,5,2,4,6-triazatriphosphorine - 2,2'; 4,2''; 6,2''' - tris(1,3,2)benzothiooxaphosphole] according to the following equation:

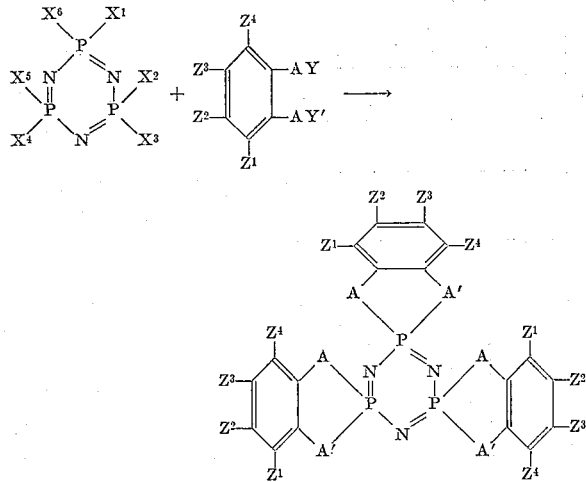

wherein $X^1$ through $X^6$ each represent chlorine or bromine, $Z^1$ through $Z^4$ each represent hydrogen, lower alkyl, halogen, lower alkoxy, nitro, halogeno(lower)alkyl, cyano, phenoxy, or other similar inert (stable) substituents, Y and Y' each represent hydrogen or alkali metal, and A and A' each represent oxygen or sulfur. This reaction is made to take place in the presence of organic solvent and the base is one which is capable of forming stable salts with hydrogen chloride or hydrogen bromide.

Typical bases within the purview of the present invention are: alkali metal hydroxides and carbonates, such as potassium, sodium and lithium hydroxides and carbonates; alkaline earth hydroxides and carbonates, such as calcium, magnesium, barium, and ammonium hydroxides and carbonates; quaternary ammonium hydroxides, such as benzyltrimethylammonium hydroxide, tribenzylmethylammonium hydroxide, and tetraalkyl(lower)ammonium hydroxide; guanidines and biguanides, such as hexaalkyl-(lower)biguanide, heptaalkyl(lower)biguanide, and tetraalkyl(lower)guanidine; triaalkyl(lower)amines, such as triethylamine, tributylamine, and trimethylamine; ammonia; pyridine; and the like.

Typical inert organic solvents contemplated herein are: ethers, such as dioxane, diethoxyethane, dimethoxyethane, diethylether of diethylene glycol, and tetrahydrofuran; aromatic hydrocarbons, such as benzene, toluene, xylene, mesitylene; acetonitrile; dimethylformamide; dimethylsulfoxide; halogenated aliphatic ($C_1$-$C_8$) hydrocarbons, such as chloroform, trichloroethylene; ketones, such as acetone, diethyl ketone, methylethyl ketone, diisobutyl ketone; and the like. An excess of the base, such as pyridine, trialkylamine, and the like, may be used as a solvent if such base is liquid at reaction temperature. Preferably, however, the solvents listed above are employed.

While the reactions of the present invention are best carried out at a temperature in the range of 25° C. to 100° C., temperatures in the range of −50° C. to 200° C. are contemplated herein. Likewise, atmospheric pressure is preferred, but super-atmospheric pressures and sub-atmospheric pressures may be employed generally with an accompanying change in temperature. For instance, at super-atmospheric pressures higher temperatures may be employed since the boiling temperature of the solvent varies in proportion to the pressure thereon. Generally, when operating at atmospheric pressure, temepratures below the boiling point of the solvent are employed.

Usually, three moles of the catechol or thiocatechol, substituted or unsubstituted, are brought into reactive contact with the phosphonitrilic trimer reactant. It has been found, however, that less than stoichiometric amounts or even greater than stoichiometric amounts may be reacted without upsetting the nature of the reaction. Therefore, the mole ratio is not critical. Also, it has been found that usually, one mole of base is employed per mole of replaceable hydrogen (Y) (Y') on the catechol reactant. Of course, if Y and Y' both represent an alkali metal, no base is needed.

The trispiro [1,3,5,2,4,6-triazatriphosphorine-2,2'; 4,2''; 6,2''' - tris(1,3,2)benzodioxaphosphole] and trispiro[1,3,-5,2,4,6 - triazatriphosphorine - 2,2'; 4,2''; 6,2'''-tris(1,3,2) benzodithiophosphole] and trispiro[1,3,5,2,4,6-triazatriphosphorine - 2,2'; 4.2''; 6,2''' - tris(1,3,2)benzothiooxaphosphole] compounds of the present invention are valuable flame retardants for fabrics. For example, up to about 10% concentration in a suitable solvent may serve as a bath for the treatment of fabrics by dipping the latter in said bath for a short period of time. A cotton fabric, for instance, thus treated exhibits noticeable and very desirable flame retardance properties.

While not intended to diminish the scope of the present invention, the following examples are illustrative:

*Example I.—Trispiro[1,3,5,2,4,6-triazatriphosphorine-2,2'; 4,2''; 6,2'''-tris(1,3,2)benzodioxaphosphole]*

Phosphonitrilic chloride trimer (10.44 grams; 0.03 mole) and catechol (9.9 grams; 0.09 mole) are dissolved in toluene (500 milliliters) and to this stirred solution is added triethylamine (18.8 grams; 0.18 mole). A further 9.0 grams of triethylamine and 4.5 grams of catechol are added and the mixture is stirred at 25° C. for 72 hours. The resulting white precipitate is filtered off, washed with toluene and dried, yielding 35.2 grams of material which is extracted with boiling benzene. The extracts, when evaporated to dryness, yield 3 grams of a white solid having a melting point of 235° C. This is purified by recrystallization from benzene, followed by sublimation at 230° C. to 240° C. at 0.05 millimeter mercury pressure to yield a product having a melting point of 243° C.–244° C. Analysis of this product indicates it is trispiro [1,3,5,-2,4,6 - triazatriphosphorine - 2,2'; 4,2''; 6,2''' - tris(1,3,2)-benzodioxaphosphole].

*Example II*

In a glass vacuum system, phosphonitrilic chloride trimer (6.96 grams; 0.02 mole) and catechol (6.6 grams; 0.06 mole) are dissolved in dry pyridine (100 milliliters) at 0° C. The stirred mixture is heated gradually from 0° C. to 25° C. over 72 hours, and from 25° C. to 70° C. over 1 hour, after which it is maintained at this temperature for 8 hours and then stirred at 25° C. for another 16

TABLE I

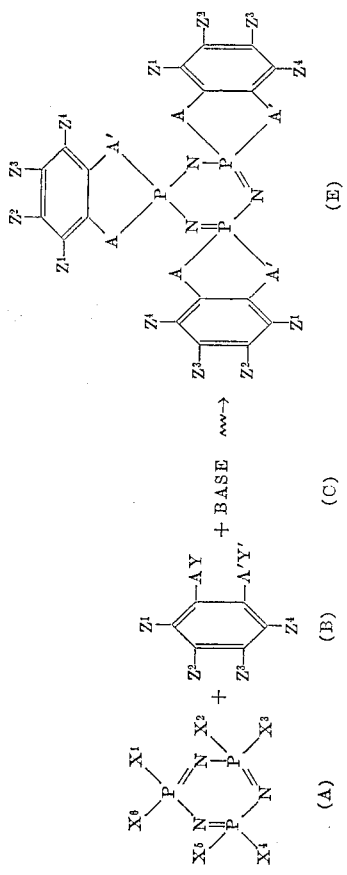

| Example No. | $X^1$ | $X^2$ | $X^3$ | $X^4$ | $X^5$ | $X^6$ | A | A' | $Z^1$ | $Z^2$ | $Z^3$ | $Z^4$ | Y | Y' | Base | Mole ratio A:B:C | Temp., °C. | Solvent |
|---|---|---|---|---|---|---|---|---|---|---|---|---|---|---|---|---|---|---|
| V | Cl | Cl | Cl | Cl | Br | Br | O | O | H | $OC_2H_5$ | $CH_3$ | H | H | H | Triethylamine | 1:3:6 | 100 | Dioxane. |
| VI | Br | Br | Br | Br | Br | Br | O | O | $CH_3$ | $CH_3$ | $CH_2Cl$ | $CH_3$ | H | H | Pyridine | 1:3:6 | 70 | Tetrahydrofuran. |
| VII | Cl | Cl | Cl | Cl | Br | Br | O | O | H | $CH_3$ | $OCH_3$ | H | H | H | Ammonia | 1:3:3 | 100 | Dimethylformamide. |
| VIII | Br | Br | Br | Br | Br | Br | O | O | H | $OCH_3$ | H | H | H | Na | Sodium hydroxide | 1:3:6 | 50 | Acetone. |
| IX | Cl | Cl | Cl | Cl | Br | Br | O | O | Cl | Cl | Cl | Cl | K | K | None | 1:3:0 | 100 | Dimethylformamide. |
| X | Cl | Cl | Cl | Cl | Cl | Cl | O | O | H | H | H | H | H | H | Ammonium hydroxide | 1:3:6 | 70 | Tetrahydrofuran. |
| XI | Cl | Cl | Cl | Cl | Cl | Cl | S | S | H | $CH_2CH_2CH_3$ | H | H | H | H | Tetraethylguanidine | 2:3:6 | 70 | Chloroform. |
| XII | Cl | Cl | Cl | Cl | Cl | Cl | S | S | Br | Br | Br | Br | H | H | Benzyltrimethylammonium hydroxide | 2:3:6 | 70 | Trichloroethylene. |
| XIII | Cl | Cl | Cl | Cl | Cl | Cl | O | O | H | $NO_2$ | H | H | H | H | Sodium carbonate | 1:3:6 | 70 | Tetrahydrofuran. |
| XIV | Cl | Cl | Cl | Cl | Cl | Cl | O | O | H | CN | H | H | H | H | Triethylamine | 1:3:3 | 60 | Tetrahydrofuran. |
| XV | Cl | Cl | Cl | Cl | Cl | Cl | O | O | H | $OC_6H_5$ | H | H | H | H | Sodium hydroxide | 1:3:6 | 70 | Dioxane. | hours. The resulting white precipitate (2 grams) is filtered off and recrystallized from benzene to give white product crystals having a melting point 245° C. which analyze as trispiro [1,3,5,2,4,6-triazatriphosphorine-2,2'; 4,2''; 6,2'''-tris(1,3,2)benzodioxaphosphole].

*Example III*

Phosphonitrilic chloride trimer (20.8 grams; 0.06 mole) and catechol (19.8 grams; 0.18 mole) are dissolved in tetrahydrofuran (500 milliliters) and triethylamine (55.6 grams; 0.55 mole) is added quickly with stirring. This mixture is refluxed for 2 hours and filtered hot. The resulting insoluble material (66.3 grams) is extracted with boiling benzene (1000 milliliters) which, when cooled, yields crystals which analyze as trispiro [1,3,5,2,4,6-triazatriphosphorine - 2,2'; 4,2''; 6,2''' - tris(1,3,2)benzodioxaphosphole], melting point 244° C.–245° C. The infrared spectrum of this material is identical with those of Examples I and II, above.

*Example IV*

A solution of catechol (95 grams, 0.804 mole) and triethylamine (175 grams, 1.728 moles) in tetrahydrofuran (500 milliliters) is added slowly to a stirred solution of phosphonitrilic chloride trimer (100 grams; 0.288 mole) in tetrahydrofuran. After completion of the addition the resulting mixture is refluxed for 2 hours and is stirred at 25° C. for 48 hours.

A white solid is thus formed and it is filtered off dried (350 grams), and washed with water to remove triethylamine hydrochloride and to leave a white powdery residue (136 grams). This material is subjected to prolonged extraction with toluene and benzene in a soxhlet apparatus. The extracts, when cooled, yield a total of 30.5 grams of trispiro [1,3,5,2,4,6-triazatriphosphorine-2,2'; 4,2''; 6,2'''-tris(1,3,2)benzodioxaphosphole] which, when recrystallized from benzene, melts between 244° C. and 245° C. and has an infrared spectrum identical to those of Examples I through III, above.

*Examples V–XIII*

Example I, hereinabove, is repeated in every essential respect in each of the following examples, excepting as shown in Table I.

In the above Table I the corresponding product (E) is prepared in each example, wherein $Z^1$ through $Z^4$ correspond to the same symbols found in the columns under reactant (B).

Clearly, the instant discovery encompasses numerous modifications within the skill of the art. Consequently, while the present invention has been described in detail with respect to specific embodiments thereof, it is not intended that these details be construed as limitations upon the scope of the invention, except insofar as they appear in the appended claims.

I claim:
1. A compound of the formula

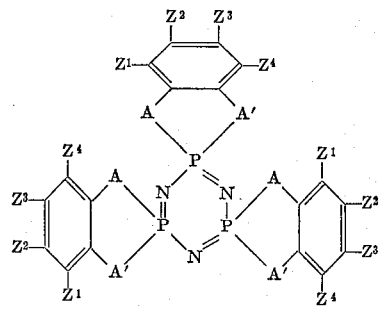

wherein $Z^1$ through $Z^4$ each represent a member selected from the group consisting of hydrogen, lower alkyl, halogen, lower alkoxy, nitro, cyano, phenoxy, and halogeno lower alkyl, and A and A' each represent a member selected from the group consisting of oxygen and sulfur.

2. Trispiro[1,3,5,2,4,6-triazatriphosphorine-2,2'; 4,2''; 6,2'''-tris(1,3,2)benzodioxaphosphole].

References Cited by the Examiner

Kosolapoff, "Organo-Phosphorus Compounds," John Wiley and Sons, New York, New York (1950), pages 211–213.

CHARLES B. PARKER, *Primary Examiner.*

FRANK M. SIKORA, *Assistant Examiner.*

UNITED STATES PATENT OFFICE
CERTIFICATE OF CORRECTION

Patent No. 3,294,872　　　　　　　　　　　　December 27, 1966

Harry Rex Allcock

It is hereby certified that error appears in the above numbered patent requiring correction and that the said Letters Patent should read as corrected below.

Column 2, line 17, for "temepratures" read -- temperatures --; line 34, for "4.2″" read -- 4,2″ --; columns 3 and 4, TABLE I, sixth column, line 9 thereof, for "C." read -- Cl --.

Signed and sealed this 26th day of September 1967.

(SEAL)
Attest:

ERNEST W. SWIDER
Attesting Officer

EDWARD J. BRENNER
Commissioner of Patents